Feb. 16, 1960 E. T. LORIG 2,925,168
APPARATUS FOR IMPROVING TRACKING OF ENDLESS BELTS
Filed Nov. 8, 1954 3 Sheets-Sheet 1
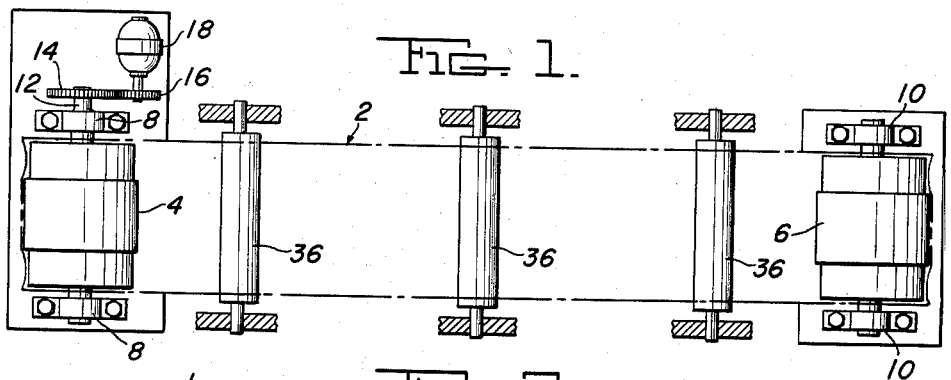
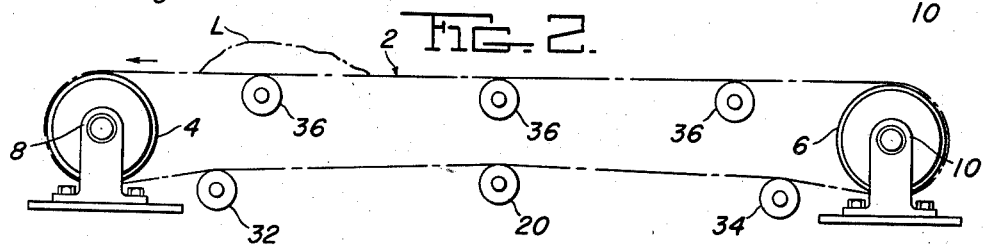
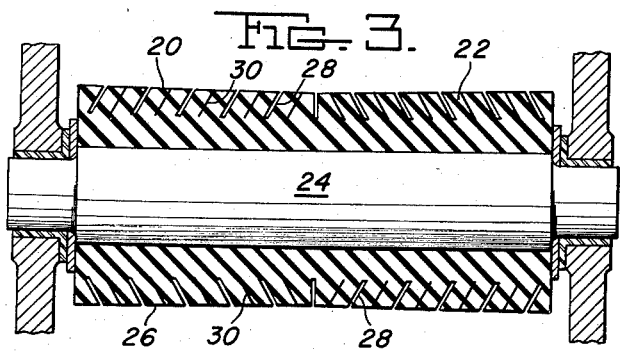
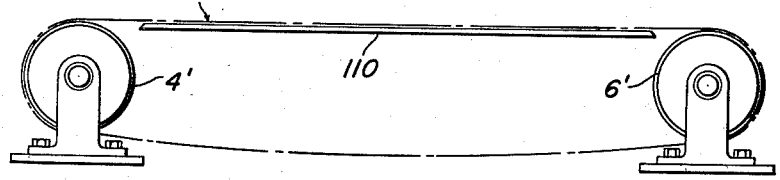
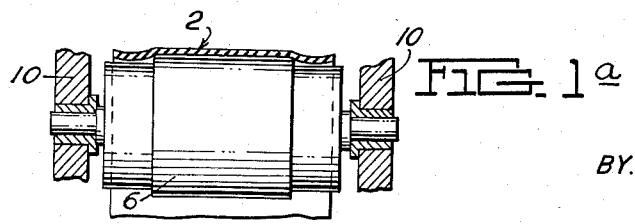
INVENTOR:
EDWIN T. LORIG,
BY: Donald G. Dalton
his Attorney.

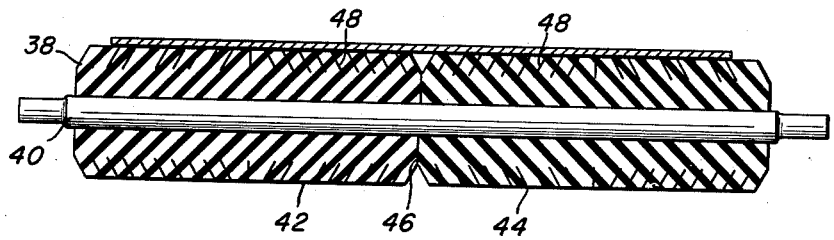
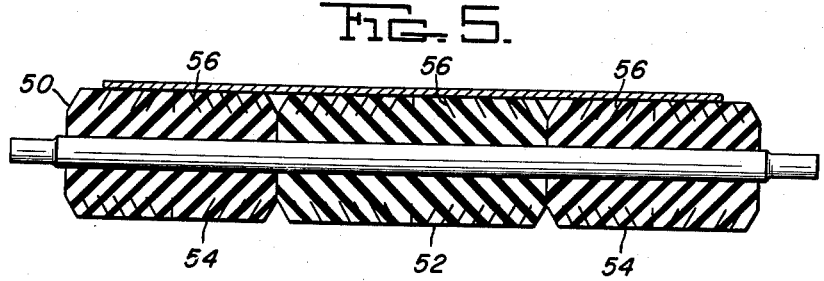
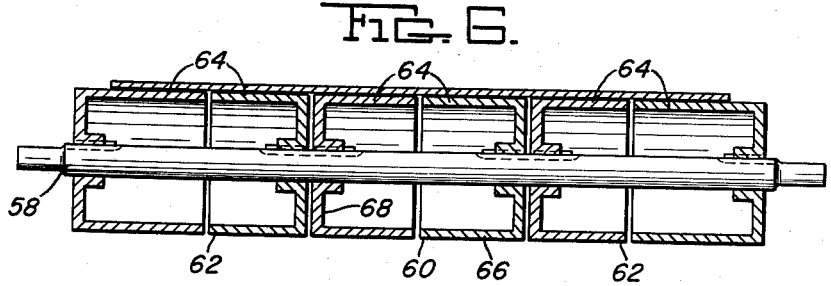
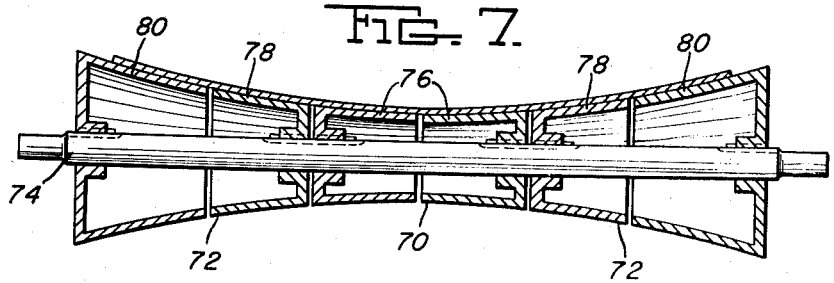

Feb. 16, 1960 E. T. LORIG 2,925,168
APPARATUS FOR IMPROVING TRACKING OF ENDLESS BELTS
Filed Nov. 8, 1954 3 Sheets-Sheet 3
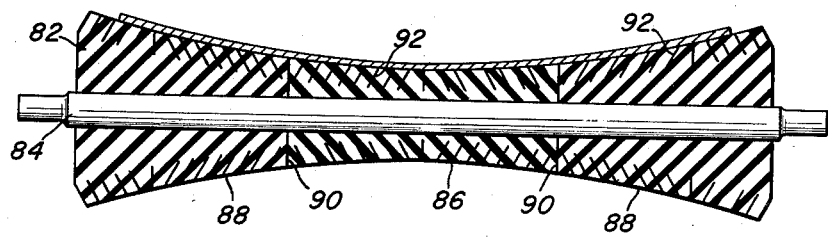
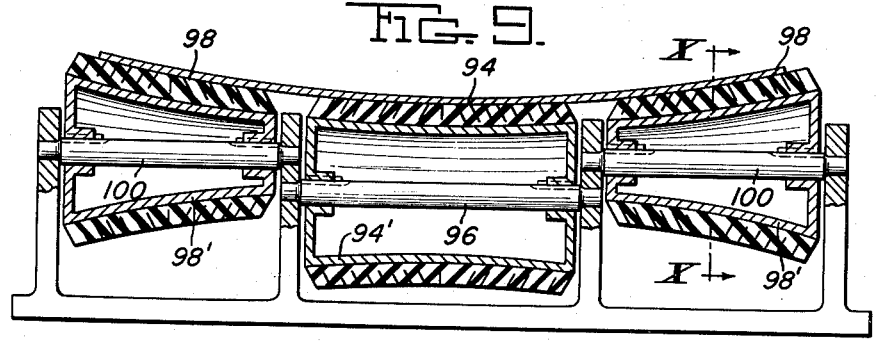
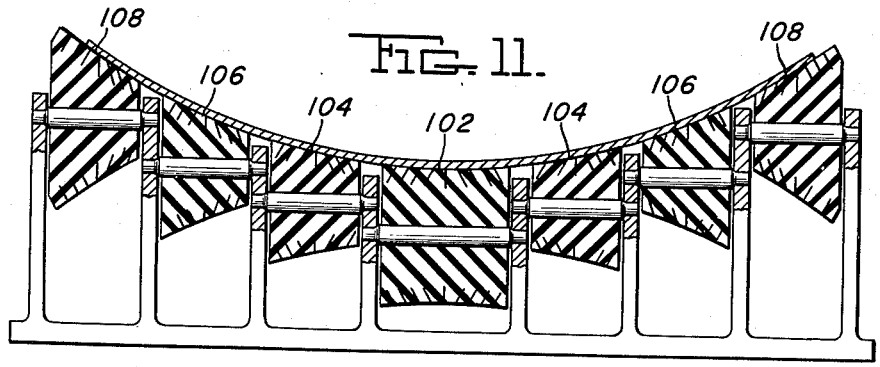
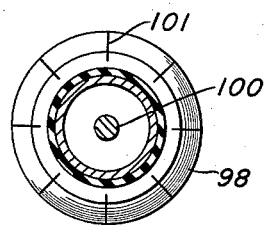
INVENTOR:
EDWIN T. LORIG,
BY: Donald G. Dalton
his Attorney.

United States Patent Office 2,925,168
Patented Feb. 16, 1960

2,925,168
APPARATUS FOR IMPROVING TRACKING OF ENDLESS BELTS

Edwin T. Lorig, Pittsburgh, Pa., assignor to United States Steel Corporation, a corporation of New Jersey Application November 8, 1954, Serial No. 467,308

8 Claims. (Cl. 198—202)

This invention relates to a belt conveyor having improved tracking ability under both loaded and unloaded conditions and more particularly to a belt conveyor which utilizes a belt for conveying materials which tend to stick to the belt. In the case of flat belts made of rubber compositions or other materials having a low modulus of elasticity and highly resilient properties, crowned pulleys are used to keep the belts centered. This arrangement is not satisfactory for many reasons, including damage to the belt caused by the constant overstraining of the center and edge fibers which must be abnormally deformed to secure tracking. In the case of metallic belts, slightly crowned or flat pulleys and intermediate supporting idler rolls are used with the pulley and roll bodies usually extending beyond the edges of the belt. Such an arrangement is not satisfactory for many reasons, including those mentioned above. It has also been suggested that self-centering rolls be used as head and/or tail pulleys as shown in my prior Patent No. 2,665,592, dated January 12, 1954. While this arrangement is suitable for many applications it is not entirely satisfactory for all purposes. In the case of troughed belt conveyors three-roll troughing idlers are generally used to support the upper run of the belt with the end or outside idlers sloping upwardly to form the trough. In other cases flexible slings or ropes with idler rollers mounted thereon for supporting the belt are sometimes used. These arrangements are not suitable for various reasons especially when the belt is eccentrically loaded or has no load thereon.

It is therefore an object of my invention to provide a belt conveyor for low and high speed operations in which the head and tail pulleys have a cylindrical belt supporting surface and in which means are provided for centering and removing detrimental tracking accumulations upon the carrying surface of the belt during its return cycle.

Another object is to provide means for preventing such detrimental tracking accumulations from becoming lodged on the belt return idler roll surfaces themselves and to improve the life of belts, pulleys, bearings and rolls.

Still another object is to provide apparatus for keeping a troughed conveyor belt in centered position.

These and other objects will be more apparent after referring to the following specification and attached drawings, in which:

Figure 1 is a schematic plan view of a conveyor incorporating my invention;

Figure 1a is a view showing the belt passing around the end pulley of Figure 1;

Figure 2 is a side elevation of the conveyor of Figure 1;

Figure 3 is an enlarged sectional view of a return idler;

Figure 4 is an enlarged sectional view of a second type of self-centering roll used in the belt conveyor of Figures 1 and 2;

Figure 5 is an enlarged sectional view of a third type of self-centering roll used in the belt conveyor of my invention;

Figure 6 is an enlarged sectional view of still another type of self-centering roll used in the belt conveyor of my invention;

Figure 7 is an enlarged sectional view of a self-centering roll used in a troughed belt conveyor;

Figure 8 is an enlarged sectional view of a second type of self-centering roll used in a troughed belt conveyor;

Figure 9 is an enlarged sectional view of a third type of self-centering roll used in a troughed belt conveyor;

Figure 10 is a sectional view taken on the line X—X of Figure 9;

Figure 11 is an enlarged sectional view of a fourth type of self-centering roll used in a troughed belt conveyor; and Figure 12 is a view, similar to Figure 2, showing another embodiment of my device.

Referring more particularly to Figures 1 to 3 of the drawings, the reference numeral 2 indicates an endless belt which passes around spaced apart cylindrical pulleys 4 and 6. The belt supporting surface of each pulley is cylindrical and may be as wide or wider than the belt in accordance with usual practices. However, it is preferred to use narrow-bodied rolls as shown, that is, rolls having their strip supporting surfaces of considerable less width than the belt in order to prevent detrimental distortional belt edge contact with the strip supporing surface. As the belt passes around the pulley I have found that the edges do not remain flat but they become trough shaped with the open end of the trough away from the pulley and the bottom surface of the belt at the bottom of the trough being below the remaining contact surface of the belt. The roll surface should be of such width that the troughs are beyond the supporting surface as best shown in Figure 1a. The pulleys 4 and 6 are mounted in bearings 8 and 10, respectively. The shaft of the pulley 4 is provided with an extension 12 which extends beyond bearing 8 in order to provide means for driving the pulley. The extension 12 may have a gear 14 mounted thereon in mesh with a pinion 16 which is driven by means of a motor 18. A self-centering roll 20 is mounted between the pulleys 4 and 6 and bears against the lower surface of the lower or return run of the belt so as to deflect it upwardly. The roll 20 consists of a sleeve 22, made of rubber, composition material, neoprene, leather, fabric, or other resilient material, mounted on a mandrel or shaft 24 for rotation therewith. The sleeve 22, the belt supporting surface of which is preferably slightly concave, has a plurality of flexible laminations 26 on its outer periphery arranged on both sides of a transverse central plane with the laminations being inclined radially toward the axis of the roll away from the transverse central plane. The laminations 26 may be provided by means of slits or slots extending annularly or helically around the periphery of the roll surface. The slits or slots may be formed by removing part of the rubber as at 28 in the manner shown in my prior Patent No. 2,592,581, dated April 15, 1952, while the slits or slots 30 between the slots 28 may be formed by merely slitting the rubber as shown in my copending application, Serial No. 380,646, filed September 17, 1953, now Patent No. 2,772,879, dated December 4, 1956. If desired all wide slots, all narrow slits or a combination of both may be used. In any case the roll will function to center the belt as it passes thereover. The slots or slits 28 and 30 are sufficiently deep and the angle of the slots is such that the outer portion of each lamination is entirely out of the plane of the inner part of the lamination. The slots or slits are preferably at least ½" deep. If the conveyor is relatively short and reversible a single self-centering roll 20 may be located approximately midway between the narrow-bodied pulleys 4 and 6. For relatively long reversible conveyors it is preferred to have two additional rolls 32 and 34 of the same construction as roll 20 located adjacent the pulleys 4 and 6, respectively, and to have the belt supporting surface of roll 20 cylindrical. Long belt conveyors, whether reversible or not, require intermediate supports for both the upper and lower runs of the belt. If cylindrical idler rollers are used for such supports they should preferably be of greater width than the belt. In order to support the upper run of the belt 2 on which the load L is supported, additional cylindrical rolls 36 preferably of the self-centering type may be provided along the length thereof. In the case of a short unidirectional belt moving in the direction of the arrow, the self-centering roll 34 alone may be used for the bottom run.

The operation of the device is as follows:

As the belt 2 moves in the direction indicated by the arrow, it carries the load L thereon and the rolls 20, 32, 34 and 36 will keep the belt centered because of their inherent built-in centering ability. In addition, the laminations 26 of the return idler rolls by moving a slight amount with respect to each other will wipe the outer surface of the belt 2 and gradually remove the accumulations of dirt thereon, particularly just inside the ends of the rolls where such accumulations do most of the damage with respect to erratic tracking.

The self-centering return idler instead of being constructed as shown in Figure 3 may be constructed as shown in Figure 4. As there shown the roll consists of a sleeve 38 made of rubber or other resilient material mounted on a shaft 40 for rotation therewith. The sleeve 38 consists of two sections 42 and 44 separated by a transverse central groove 46. Each section 42 and 44 is constructed in a manner similar to the roll of Figure 3, that is, it has a plurality of flexible laminations 48 on its outer periphery arranged on both sides of a transverse central plane with the laminations being inclined radially toward the axis of the roll away from the transverse central plane. If desired the sections 42 and 44 may be mounted for independent rotation on the shaft 40.

In place of the cylindrical self-centering rolls 36 a load carrying roll 50 such as shown in Figure 5 may be used. This roll is constructed in the same general manner as the roll of Figure 4 except that it is divided into a central section 52 and two end sections 54 with each section having a plurality of flexible laminations 56 on its outer periphery arranged on both sides of a transverse central plane with the laminations being inclined radially toward the axis of the roll away from the transverse central plane.

The roll shown in Figure 6 may also be used in place of the rolls 36. As shown the roll has a shaft 58 having a central portion 60 mounted thereon between two end portions 62. Each section consists of two parts 64, each having a rim 66 supported by a web 68 keyed to the shaft 58. The rims 66 are preferably cylindrical and of uniform diameter. Each rim is free to deflect toward the shaft 58 in the manner described in my patent No. 2,593,158, dated April 15, 1952. Any odd number of portions may be mounted on the shaft 58. This roll is particularly suitable for centering and aligning metallic flat conveyor belts which are subjected to eccentric live loading under heat.

In the case of a troughed belt conveyor an arrangement similar to that shown in Figure 7 may be used. In this arrangement a roller assembly made up of a central portion 70 and two end portions 72 may be keyed on a rotating shaft 74. The central section 70 is made up of a pair of rollers 76 having a concave strip supporting surface. The end portions 72 are made up of roller sections 78 and 80. The roller section 80 has a minimum diameter substantially equal to the maximum diameter of section 78 and also having a concave strip supporting surface. These rolls functions substantially in the same manner as the roll of Figure 6.

Figure 8 discloses another type of troughing load supporting roll assembly in which a resilient sleeve 82 is mounted on a shaft 84. Sleeve 82 is divided into a central section 86 and two end sections 88 with the sections being separated by means of peripheral slots 90. Each of the sections 86 and 88 are provided with flexible laminations 92 arranged on both sides of a transverse central plane, as shown. The laminations are inclined radially toward the axis of the roll away from the transverse central plane. The operation of this roll is essentially the same as that shown in Figure 5.

Figures 9 and 10 show an arrangement similar to that of Figure 8 except that the central portion 94 is mounted on a shell 94' which is carried by a separate shaft 96 and the end portions 98 are each mounted on a shell 98' which is carried by a shaft 100. The axes of the shafts 96 and 100 are parallel to each other and parallel to the axis of the end pulleys. Each portion is completely separate from the other. Longitudinal slots 101 are provided in the outer periphery to increase the flexibility of the rubber covering.

Figure 11 shows an arrangement essentially the same as that of Figure 9 except that it is particularly adapted to deep troughed belt conveyors. In this embodiment the central section 102 and side sections 104, 106 and 108 are each mounted on a separate shaft. The rubber may either be mounted directly on the shaft as shown or on a metal shell as in Figure 9.

For short conveyor belts, especially belts made of low modulus materials, the intermediate rolls may be omitted and the belt 2' supported on narrow-bodied head and tail pulleys 4' and 6' as shown in Figure 12. The belt will remain centered on the pulleys even though its upper run is supported on a plate or platen 110.

In the belt assemblies described above the belt will track properly under some conditions if it passes around a substantial arc (approximately at least 90°) of each of a plurality of spaced apart cylindrical narrow-bodied rolls. Under other conditions it will be necessary to provide at least one self-centering roll which preferably is of the type shown at 20, but which may be of the type shown in my Patents Nos. 2,593,157 and 2,593,158, both dated April 15, 1952.

While several embodiments of my invention have been shown and described it will be apparent that other adaptations and modifications may be made without departing from the scope of the following claims.

I claim:

1. A belt conveyor comprising a belt, two spaced apart pulleys around which the belt passes, the belt supporting surface of said pulleys being cylindrical and of less width than the width of the belt, a roll bearing against the lower surface of the lower run of said belt and deflecting it upwardly, a roll bearing against the lower surface of the upper run of said belt, each of said rolls having a plurality of flexible laminations on its outer periphery arranged on both sides of a transverse central plane, said lamination being inclined radially toward the axis of the roll away from the said transverse central plane, the diameter of each of said rolls being no greater at its center than on each side thereof.

2. An assembly comprising an endless belt, and spaced apart pulleys around a substantial arc of which the belt passes, said pulleys having a cylindrical belt supporting surface of considerable less width than the width of the belt, the portion of the belt extending beyond the belt supporting surface of the pulleys being trough shaped with the open end of the trough facing away from the axis of the pulley and the inner surface of the belt at the bottom of the trough being radially inward from the remaining inner surface of the belt whereby the weight of the overhanging portions of the belt prevents the edges of the belt from moving onto the said belt supporting surface.

3. An assembly comprising an endless belt, and spaced apart pulleys around a substantial arc of which the belt passes, said pulleys having a cylindrical belt supporting surface of considerable less width than the width of the belt, the portion of the belt extending beyond the belt supporting surface of the pulleys being trough shaped with the open end of the trough facing away from the axis of the pulley and the inner surface of the belt at the bottom of the trough being radially inward from the remaining inner surface of the belt whereby the weight of the overhanging portions of the belt prevents the edges of the belt from moving onto the said belt supporting surface, and a self-centering roll between said spaced apart pulleys for supporting said belt.

4. A belt conveyor comprising a belt, two spaced apart pulleys around which the belt passes, and a roll bearing against the lower surface of the lower run of said belt and deflecting it upwardly, said roll having a central portion between two end portions, each of said portions having a radial groove, a belt supporting surface on each side of the radial groove, and means for supporting each of said surfaces for limited and progressive deflection toward the said radial groove.

5. A belt conveyor comprising a belt, two spaced apart pulleys around which the belt passes, the belt supporting surface of said pulleys being cylindrical and of less width than the width of the belt, a roll bearing against the lower surface of the lower run of said belt and deflecting it upwardly, a roll bearing against the lower surface of the upper run of said belt, each of said rolls having a central portion between two end portions, each of said portions having a radial groove, a belt supporting surface on each side of the radial groove, and means for supporting each of said surfaces for limited and progressive deflection toward the said radial groove.

6. An assembly comprising an endless belt, and spaced apart rolls around a substantial arc of which the belt passes, said rolls having a cylindrical belt supporting surface of considerable less width than the width of the belt, and a plurality of rolls between said spaced apart rolls for supporting said belt, each of said plurality of rolls having a central portion between two end portions, each of said portions having a radial groove, a belt supporting surface on each side of the radial groove, and means for supporting each of said surfaces for limited and progressive deflection toward the said radial groove.

7. A troughed belt conveyor comprising a belt, two spaced apart pulleys around which the belt passes, and a plurality of roll assemblies between said spaced apart pulleys for supporting the upper run of said belt, each of said roll assemblies having a central portion between two end portions, each of said portions having a radial groove, a belt supporting surface on each side of the radial groove, and means for supporting each of said surfaces for limited and progressive deflection toward the said radial groove, each of said belt supporting surfaces being concave and rotatable about an axis parallel to the axes of said pulleys.

8. A belt conveyor comprising a belt, two spaced apart pulleys around which the belt passes, and a roll bearing against the lower surface of the upper run of said belt and deflecting it upwardly, said roll having a central portion between two end portions, each of said portions having a radial groove, a belt supporting surface on each side of the radial groove, and means for supporting each of said surfaces for limited and progressive deflection toward the said radial groove.

References Cited in the file of this patent

UNITED STATES PATENTS

| | | |
|---|---|---|
| 714,812 | Mann et al. | Dec. 2, 1902 |
| 728,005 | Plummer | May 12, 1903 |
| 2,568,174 | Staacke | Sept. 18, 1951 |
| 2,592,581 | Lorig | Apr. 15, 1952 |
| 2,660,429 | Lorig | Nov. 24, 1952 |
| 2,706,625 | Lorig | Apr. 19, 1955 |
| 2,721,739 | Mursch et al. | Oct. 25, 1955 |